United States Patent [19]
Walsh

[11] Patent Number: 5,344,484
[45] Date of Patent: Sep. 6, 1994

[54] ISOCYANATE BONDED WOOD COMPOSITE AND METHOD OF MANUFACTURING THE SAME

[75] Inventor: John P. Walsh, St. Charles, Ill.

[73] Assignee: Masonite Corporation, Chicago, Ill.

[21] Appl. No.: 957,911

[22] Filed: Oct. 8, 1992

[51] Int. Cl.$^5$ .......................... C08L 1/02; B32B 23/14
[52] U.S. Cl. .................... 106/201; 106/203; 106/204; 156/62.2; 156/328; 156/331.4; 264/126; 428/326; 428/425.1; 428/498; 428/537.1
[58] Field of Search ..................... 106/163.1, 201, 203, 106/204; 156/62.2, 328, 331.4; 264/126; 428/326, 425.1, 498, 537.1

[56] References Cited
U.S. PATENT DOCUMENTS

| | | | |
|---|---|---|---|
| 3,440,189 | 4/1969 | Sharp | 260/9 |
| 3,773,587 | 11/1973 | Flewwelling | 156/201 |
| 3,919,017 | 11/1975 | Shoemaker et al. | 156/62.2 |
| 4,072,558 | 2/1978 | Akerson | 162/145 |
| 4,100,328 | 7/1978 | Gallagher | 428/407 |
| 4,359,507 | 11/1982 | Gaul et al. | 106/203 |
| 4,388,138 | 6/1983 | Brown et al. | 106/271 |
| 4,396,673 | 8/1983 | Ball et al. | 106/271 |

*Primary Examiner*—Anthony Green
*Attorney, Agent, or Firm*—Marshall, O'Toole, Gerstein, Murray & Borun

[57] ABSTRACT

An isocyanate bonded wood composite, such as a doorskin, comprising about 95% to about 99% by weight wood fiber, about 1% to about 4% by weight of an organic isocyanate and 0% to about 2% by weight of a wax, and its method of manufacture, are disclosed. The isocyanate bonded wood composite is manufactured by admixing the ingredients, then pressing the admixed ingredients at a temperature of about 200° F. to about 320° F., for a sufficient time and at a sufficient pressure, to provide an isocyanate bonded wood composite having a density of about 0.9 g/cc to about 1.1 g/cc, and that demonstrates improved porosity and adhesive properties.

15 Claims, No Drawings

ISOCYANATE BONDED WOOD COMPOSITE AND METHOD OF MANUFACTURING THE SAME

FIELD OF THE INVENTION

The invention relates to an isocyanate bonded wood composite and to a method of manufacturing the wood composite. More particularly, the present invention relates to a molded, isocyanate bonded wood composite, such as a doorskin, that is manufactured at a low pressing temperature of about 200° F. to about 320° F., and exhibits both improved porosity with respect to the adhesive used to secure the wood composite to a wood frame, excellent surface strength, and improved adhesion to the wood frame.

BACKGROUND OF THE INVENTION

Wood composites, such as doorskins, are molded articles that are adhesively secured to a wood frame to provide the decorative and water-resistant outer surfaces of a door. Such wood composites traditionally are formed by the high temperature pressing of wood fragments in the presence of a binder.

Conventionally, the binder utilized in the high temperature pressing of the wood composite is a thermosetting resin, such as a phenol-formaldehyde resin, or the like. The traditional thermosetting resins require pressing temperatures in the range of about 350° F. to about 450° F. to cure the resin. Other resins, such as a melamine-formaldehyde resin or a urea-formaldehyde resin, do not require a high temperature cure, but also do not provide the water resistance properties of a resin cured at a high temperature.

Traditionally, the need to cure such a resin made it necessary to dry the wood fragments included in the wood composite to a moisture level of less than about 5%, and often to about 2%, by weight of the wood fragments, prior to pressing the wood fragments in the presence of a traditional resin binder. At wood fragment moisture levels of about 5% by weight or greater, the water interfered with the curing process of the traditional resins. In addition, when utilizing a traditional resin binder and dried wood fragments including less than 5% by weight moisture, a rehumidification step was required after pressing in order to increase the moisture content of the dried wood fragments and to provide a wood composite having acceptable commercial properties.

In general, the high temperature pressing of a traditional phenol-formaldehyde binder provides a surface that is porous with respect to the adhesive, but having a weak surface strength. In contrast, the high temperature pressing of an isocyanate binder provides a strong surface that is nonporous with respect to the adhesive. Therefore, molded wood composites including a traditional phenol-formaldehyde, or similar, resin binder exhibited the advantage of good porosity with respect to the adhesive used to bind the wood composite to a substrate, such as a wood frame. A wood composite exhibiting a good porosity with respect to the adhesive adheres more strongly to the underlying wood frame. Insufficient penetration of the adhesive into the wood composite decreases the adhesion between the wood composite and the frame.

However, the traditional phenol-formaldehyde binders provided weak surfaces that had to be reinforced by an additional post-press resin treatment. The problem of weak surfaces that had to be reinforced without introducing a poor porosity with respect to the adhesive, and the resulting poor adhesion to an underlying wood frame, is a problem whose solution has evaded investigators in the art. Surprisingly, the present isocyanate bonded wood composite, and method, solve this persistent problem, and provide a wood composite having strong surfaces without the need for a post-press reinforcing treatment and provide good porosity with respect to the adhesive.

Previous investigators have searched for alternative binders for wood composites that overcome the above-described disadvantages exhibited by traditional phenol-formaldehyde and similar resins. For example, Sharp, in U.S. Pat. No. 3,440,189, discloses the use of an isocyanate and a resinous extract of pine wood that contains hydroxyl moieties, together with wood fragments and a basic catalyst, to provide a particle board that demonstrates a water resistance comparable to plywood. Gallagher, in U.S. Pat. No. 4,100,138, discloses an isocyanate and polyether polyol binder as a replacement for the phenol-formaldehyde resin as the binder in a wood composite.

The isocyanate-based binders of both Sharp and Gallagher include intentionally added compounds having an active hydroxyl moiety which are present to react with the isocyanate. Further, neither Gallagher nor Sharp teaches or suggests that the particle board demonstrates improved porosity with respect to an adhesive and improved adhesive properties compared to a particle board including a traditional phenolformaldehyde resin binder.

SUMMARY OF TEE INVENTION

The invention is directed to an isocyanate bonded wood composite comprising a wood fiber, an organic isocyanate and, optionally, a wax, and to its method of manufacture. The isocyanate bonded wood composite can be manufactured at a low pressing temperature of about 200° F. to about 320° F., and in the essential absence of an intentionally added compound having an active hydroxyl moiety which is reactive with the isocyanate. The inventive composites demonstrate an improved adhesive strength making them useful as decorative and water-resistant molded articles, such as doorskins, for application to a wood frame.

In particular, the wood composite comprises, by weight, about 95% to about 99% wood fiber, about 1% to about 4% of an organic isocyanate, and 0% to about 2% of a wax. The isocyanate bonded wood composite, after pressing at about 200° F. to about 320° F., exhibits a density of about 0.9 g/cc to about 1.1 g/cc; demonstrates an improved porosity with respect to adhesives used to secure the wood composite to a wood frame; demonstrates improved adhesion to the wood frame; is sufficiently strong to obviate a post-press reinforcing treatment; is paintable; does not require rehumidification after manufacture; and possesses sufficient esthetic properties for use as a decorative wood composite.

Surprisingly and unexpectedly, the isocyanate bonded wood composites of the invention can be manufactured at a low pressing temperature of about 200° F. to about 320° F., and preferably about 240° F. to about 280° F., in the essential absence of an intentionally added compound that includes an active hydroxyl moiety which is reactive with the isocyanate. The low temperature pressing step provides an isocyanate bonded wood composite that demonstrates an improved adhesive strength when adhesively secured to a wood frame compared to an identical isocyanate bonded wood composite prepared under high pressing temperature conditions and that is sufficiently strong to obviate a post-press reinforcing treatment.

Therefore, one aspect of the invention is to provide an isocyanate bonded wood composite including wood fibers and an organic isocyanate, in the essential absence of an intentionally added compound including an active hydroxyl moiety which is reactive with the isocyanate, wherein the wood composite demonstrates improved porosity with respect to adhesives, increased surface strength, and improved adhesion upon adhesive securing to a wood frame.

Another aspect of the invention is to provide a method of manufacturing an isocyanate bonded wood composite at a low pressing temperature of about 200° F. to about 320° F., such that the isocyanate bonded wood composite demonstrates improved porosity with respect to adhesives and therefore improved adhesion to a wood frame, sufficient water resistance, and improved esthetics.

Another aspect of the invention is to provide a method of manufacturing an isocyanate bonded wood composite at a low temperature of about 200° F. to about 320° F., such that the isocyanate bonded wood composite demonstrates sufficient surface strength to obviate a post-press reinforcing process step.

Another aspect of the invention is to provide a method of manufacturing an isocyanate bonded wood composite at a low pressing temperature to obviate the process steps of drying the wood fiber to a moisture content of less than about 5% and of rehumidifying the isocyanate bonded wood composite after the pressing step.

The foregoing and other novel aspects and advantages of the present invention will become apparent to those skilled in the art from the following detailed description of the preferred embodiments.

DETAILED DESCRIPTION OF THE PREFERRED EMBODIMENTS

The isocyanate bonded wood composites of the invention comprise wood fiber, an organic isocyanate and, optionally, a wax. The isocyanate bonded wood composite can be essentially free of added compounds having active hydroxyl moieties which are reactive with the isocyanate. The isocyanate bonded wood composites can be manufactured by a method utilizing a low pressing temperature of about 200° F. to about 320° F. The method provides a molded and compressed wood composite, such as a doorskin, which possesses excellent esthetic properties, which is porous to adhesives used to secure the wood composite to a wood frame, which exhibits an excellent adhesive strength when adhesively secured to a wood frame, and which is usable after pressing without the need of a post-press reinforcement process step or the need of a rehumidification process step.

In particular, an isocyanate bonded wood composite of the present invention includes about 95% to about 99%, and preferably about 95% to about 98%, by weight of wood fiber. The wood fiber is manufactured from wood chips, and generally is a thin fiber having a length of about 0.5 mm (millimeters) to about 6 mm, and a diameter of about 0.01 mm to about 0.03 mm. More particularly, if the wood fiber is a softwood fiber, like pine, the fiber has a length of about 1 mm to about 6 mm, and a diameter of about 0.02 mm to about 0.04 mm; if the wood fiber is a hardwood, like a mixed Southern hardwood comprising predominantly oak and gum, the fiber has a length of about 0.5 mm to about 1.5 mm and a diameter of about 0.01 mm to about 0.03 mm.

Using wood fiber having such dimensions, and within the disclosed weight percentages, provides a moldable isocyanate bonded wood composite having a density of about 0.9 cc/g to about 1.1 cc/g. This density is significantly greater than the density of particle board (e.g., about 0.7 cc/g) manufactured from larger wood particles. In addition, the wood fiber utilized in the invention provides an estheticallyacceptable and porous, but hard, paintable surface.

In accordance with the method of the invention, the wood fibers can have a moisture content of about 5% or greater, such as a moisture content of about 5% to about 15% by weight of the wood fibers, without adversely affecting the pressing of the wood fibers and organic isocyanate. The presence of moisture in the wood fibers in an amount of at least about 5% by weight also provides the benefits of mediating the interaction between the organic isocyanate and the wood fiber or a second molecule of the organic isocyanate, and of reducing pyrolysis of the wood fibers during pressing, thereby providing a more esthetic, and commercially useful, wood composite. As an added advantage, the wood fibers include sufficient moisture such that a rehumidification step after pressing of the wood composite is obviated. It should be understood that wood fibers including less than about 5% by weight moisture also are useful in the wood composite and method of the present invention. However, utilizing such dried wood fibers could necessitate a rehumidification step after pressing. Therefore, it is preferred that the wood fibers include about 5% or greater moisture by weight.

To achieve the full advantage of the present invention, the wood fibers are pine wood fibers or mixed Southern hardwood wood fibers. The mixed Southern wood hardwood fibers comprise predominantly oak and gum. Pine wood fibers and mixed Southern hardwood wood fibers are preferred because of favorable economics and an abundant supply. However, it should be understood that a wood fiber from essentially any wood source, such as maple, ash, or a combination of softwood and hardwood sources, is useful in the isocyanate bonded wood composite and manufacturing method of the present invention.

In addition to the wood fiber, the isocyanate bonded wood composite includes about 1% to about 4%, and preferably 1.5% to about 3.5%, by weight of an organic isocyanate as a binder. It is theorized, but not relied upon herein, that upon subjecting the wood fiber and organic isocyanate to a pressing temperature of about 200° F. to 320° F., at a sufficient pressure and for a sufficient time, the organic isocyanate interacts with reactive moieties on the wood fibers or with another molecule of the organic isocyanate, mediated by moisture present in the wood fibers, to form a continuous binder homogeneously dispersed and bound to the wood fibers. Surprisingly, and in contrast to the other wood composites including an isocyanate binder, it is not necessary to intentionally include a compound having an active hydroxyl moiety, like a polyol, in the organic isocyanate binder.

Organic isocyanates useful in the invention include those compounds having an average of at least two isocyanate moieties. Accordingly, the organic isocyanate can react or otherwise interact with more than one wood fiber and effectively bind individual wood fibers. It is theorized that an organic isocyanate including at least two isocyanate moieties operates in a fashion analogous to a crosslinking agent in a polymerization reaction.

In accordance with an important feature of the invention, it has been found that an organic isocyanate including at least two isocyanate moieties effectively reacts or otherwise interacts with a wood fiber having a moisture content of at least about 5% by weight. The organic isocyanate, in contrast to the traditional phenol-formaldehyde resins used in wood composites, can tolerate the presence of water during the pressing step. Furthermore, the moisture in the wood fibers can act as a catalyst for the interaction between the organic isocyanate and the wood fibers, thereby facilitating an interaction at a temperature of about 200° F. to about 320° F. within the relatively short time period of about 1 minute to about 10 minutes. The short interaction time and low temperature pressing allows the isocyanate bonded wood composite to be manufactured more quickly, thereby achieving manufacturing economics.

The organic isocyanates including at least two isocyanate moieties can be aliphatic, cycloaliphatic or aromatic in nature, or a combination thereof. Preferably, the organic isocyanate is monomeric in nature. However, organic isocyanate prepolymers having a molecular weight of up to about 2,000 also are useful, as long as the organic isocyanate prepolymer can be homogeneously dispersed throughout the wood fibers prior to the pressing step.

Accordingly, useful organic isocyanates include, but are not limited to, toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4', 4''-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2', 5,5'-tetraisocyanate; 3,3'-dichlorophenyl-4,4'-diisocyanate; 2,2', 5,5'-tetrachlorodiphenyl-4,4'-diisocyanate; trimethylhexamethylene diisocyanate; m-xylene diisocyanate; polymethylene polyphenylisocyanates; and mixtures thereof.

In addition to the wood fiber and the organic isocyanate, the isocyanate bonded wood composite of the present invention also can optimally include up to about 2% by weight of the wood composite of a wax. A wax optionally is included in the isocyanate bonded wood composite to impart additional water repellency to the wood composite. Surprisingly and unexpectedly, including a wax in the wood composite does not appreciably affect the glueability or the adhesive strength demonstrated between an isocyanate bonded wood composite adhesively secured to a wood frame. Similarly, the absence of a wax does not adversely affect the beneficial properties, like porosity and adhesive strength, exhibited by an isocyanate bonded wood composite of the present invention.

The identity of the wax included in the wood composite is not particularly limited, as long as the wax imparts water repellency to the isocyanate bonded wood composite; as long as the wax does not adversely affect the porosity, adhesive strength or esthetics of the isocyanate bonded wood composite; and as long as the wax is stable at a temperature of about 200° F. to about 320° F. and under the pressing conditions encountered in the press. Accordingly, the wax included in the wood composite can be either a natural or a synthetic wax, having a melting point of about 120° F. to about 180° F., such as, for example, but not limited to, paraffin wax, polyethylene wax, microcrystalline wax, shellac wax, polyoxyethylene wax, ozokerite wax, montan wax, and combinations thereof.

The isocyanate bonded wood composite of the invention is formed by first admixing about 95 parts to about 99 parts by weight of wood fiber, about 1 part to about 4 parts by weight of an organic isocyanate, and up to about 2 parts by weight of a wax to form a wood composite mixture. The wood composite mixture then is introduced into a press, and subjected to a temperature of about 200° F. to about 320° F. and a sufficient pressure, such as initially about 750 to about 1500, and preferably about 900 to about 1200, pounds per square inch (psi), at the onset of pressing and decreasing to about 100 to about 200, and preferably about 125 to about 200, psi at the end of the pressing, for a sufficient time, such as about one to about 10 minutes, and preferably about 1 to about 5 minutes, to provide a compressed, isocyanate bonded wood composite of the present invention. Pressing the wood composite mixture within the temperature range of about 200° F. to about 320° F. for a time period of greater than about 10 minutes is not disadvantageous, but is not seen to provide any further beneficial results.

The particular time period of the pressing step is determined after considering the particular organic isocyanate binder included in the wood composite mixture, and the particular pressing temperature utilized. However, a sufficient pressing time is selected such that the pressed, isocyanate bonded wood composite swells less than 30% when subjected to a boil swell test. The boil swell test is a standard test well-known to those skilled in the art. Similarly, pressing the wood composite mixture at a pressure of greater than 1500 psi does not adversely affect the isocyanate bonded wood composite, but no additional benefits are observed. Pressing the wood composite mixture at a pressure below about 100 psi does not produce a commercially acceptable isocyanate bonded wood composite.

In accordance with another important feature of the invention, the method of forming a compressed, isocyanate bonded wood composite, like a doorskin, utilizes a low pressing temperature of about 200° F. to about 320° F., and preferably about 240° F. to about 280° F. Pressing the wood composite mixture at a temperature of about 200° F. to about 320° F., and especially at about 240° F. to about 280° F., provides an isocyanate bonded wood composite having an improved porosity with respect to the adhesive used to secure the wood composite to the wood frame. The porosity of the isocyanate bonded wood composite is an important property because the ability of the adhesive to penetrate into the wood composite is an important factor in providing good adhesion to the wood frame. The improved porosity demonstrated by an isocyanate bonded wood composite of the present invention is related to the improved glueability and adhesive strength exhibited by the wood composite.

If the isocyanate bonded wood composite is pressed at a temperature above about 320° F., the porosity of the wood composite is sufficiently decreased such that the glueability and adhesive properties of the wood composite are adversely affected. If the isocyanate bonded wood composite is pressed at a temperature below about 200° F., the organic isocyanate either will not interact with the active moieties present on the wood fibers or the interaction is retarded to such an extent that the method requires excessive pressing times, and therefore is impractical.

It should be understood that the pressure and length of time of the pressing step are not especially critical, as long as the pressure is sufficiently high, e.g., about 100 psi to about 1500 psi, to provide a compressed, isocyanate bonded wood composite of the proper dimensions, and as long as the time is sufficiently long to allow the organic isocyanate to interact with the wood fibers. The particular pressing time and pressure needed to provide an essentially completely cured wood composite will vary with the dimensions of the desired wood composite, and are readily determined by a person skilled in the art. It also should be understood that the pressure and time of the pressing step are related to the particular pressing temperature and to the particular organic isocyanate utilized in the wood composite mixture.

To further demonstrate the wood composite and method of the present invention, a doorskin, as exemplified in the following Examples 1 through 4, are prepared in a platen press. While a platen press is used to make a planar sheet of the wood composite, it also is envisioned that formed shapes of a wood composite can be manufactured by the method of the present invention. Similar to a doorskin, a shaped wood composite then can be adhesively secured to an underlying wood frame and demonstrate the same esthetics, porosity, and adhesive strength properties as a sheet of the wood composite.

EXAMPLE 1

Manufacture of a Doorskin

The following ingredients were combined and blended until the ingredients were homogeneously admixed to provide a wood composite admixture.

| Ingredient | % (by weight) |
| --- | --- |
| Pine Wood Fibers[1] | 96.5 |
| Diphenylmethane diisocyanate[2] | 2.5 |
| Wax[3] | 1 |

[1] Pine wood fibers having a length of about 1 mm (millimeter) to about 6 mm, a diameter of about 0.02 mm to about 0.04 mm, and a moisture content of about 10% by weight of the wood fibers;
[2] a 100% active organic isocyanate, sold under the tradename MONDUR E541, and available commercially from Mobay Chemical Corp., Pittsburgh, PA.; and,
[3] a paraffin wax having a melting point of about 120° F.

The wood composite admixture then was formed into a loose mat or felt, introduced into a platen press, and subjected to an initial pressure of about 1000 psi that decreased to about 200 psi during pressing, and a temperature of about 260° F. for about eighty (80) seconds. The resulting doorskin, after cooling, exhibited a density of 1.0 g/cc.

The doorskin prepared as described above included sufficient moisture to obviate a separate rehumidifying step after the pressing step. Furthermore, the doorskin of Example 1 possessed a strong, well-bonded surface that was paintable; that demonstrated an improved porosity with respect to adhesives compared to doorskins prepared from an isocyanate-based binder pressed at a high temperature; and that demonstrated an improved surface strength compared to doorskins prepared from a traditional phenol-formaldehyde resin binder. The doorskin possessed excellent esthetic properties.

The doorskin of Example 1 also demonstrated a water resistance essentially equal to the water resistance demonstrated by a doorskin including a traditional phenol-formaldehyde binder and pressed at a high temperature. Such a result is surprising because a doorskin manufactured at a low pressing temperature generally demonstrates a decreased water resistance because of incomplete binder polymerization. It is theorized, but not relied upon herein, that the moisture present in the wood fibers helps catalyze the organic isocyanate polymerization, even at the low pressing temperatures of about 200° F. to about 320° F. Accordingly, it is theorized, but is not relied upon herein, that the moisture present in the wood fibers replaces heat as a polymerization catalyst to provide a water-resistant doorskin.

The doorskin of Example 1 then was adhesively secured to a pine wood frame by means of a casein adhesive. The resulting wood door exhibited sufficient adhesive strength between the adhesively secured doorskin and the wood frame to demonstrate sufficient cleavage loads (i.e., 60 pounds), and 100% fiber failure as opposed to adhesive failure in tests attempting to separate the doorskin from the wood frame. In contrast, a doorskin manufactured from an identical wood composite mixture identical to the mixture used in Example 1 but pressed at a temperature of about 400° F., exhibited glue failure as opposed to fiber failure in the cleavage test after securing the doorskin to a wood frame with a casein adhesive.

The improved adhesive strength is directly related to the porosity of the inventive doorskin of Example 1 which enables the adhesive to sufficiently penetrate the doorskin. The increased porosity of the doorskin of Example 1 is attributed to the low temperature pressing utilized in the method of the present invention. It has been found that as the pressing temperature is increased, the porosity of the resulting doorskin is decreased, and, as a result, the ability of the doorskin to absorb the adhesive and to adhesively secure to a wood frame are decreased. Therefore, the low pressing temperature provided a doorskin having an improved porosity with respect to the adhesive and, in turn, the doorskin was more strongly secured to the wood frame.

The inventive doorskin of Example 1 is a glueable substrate having a strong surface and demonstrating an excellent adhesive strength upon adhesive securing to the wood frame. It also is envisioned, that, in addition to a casein adhesive, any adhesive known in the art can be used to secure the isocyanate bonded doorskin of the present invention to a wood frame.

The following Examples further illustrate wood composites and the method of the present invention.

EXAMPLE 2

The following ingredients are combined and blended until the ingredients are homogeneously admixed to provide a wood composite admixture.

| Ingredient | % (by weight) |
| --- | --- |
| Wood Fibers[4] | 96.5 |
| Diphenylmethane diisocyanate[2] | 2.5 |
| Wax[3] | 1 |

[4] Mixed Southern hardwood wood fibers having a length of about 0.5 mm (millimeter) to about 1.5 mm, a diameter of about 0.01 mm to about 0.03 mm, and a moisture content of about 5% by weight of the wood fibers.

The wood composite admixture then is formed into a loose mat or felt, introduced into a platen press, and subjected to a pressure of about 750 psi that decreases to about 100 psi during the pressing step and a temperature of about 280° F. for about seventy (70) seconds. The resulting doorskin, after cooling, exhibits a density of 1.1 g/cc.

EXAMPLE 3

The following ingredients are combined and blended until the ingredients are homogeneously admixed to provide a wood composite admixture.

| Ingredient | % (by weight) |
| --- | --- |
| Pine Wood Fibers[1] | 96.5 |
| Diphenylmethane diisocyanate[2] | 3.0 |
| Wax[3] | 0.5 |

The wood composite admixture then is formed into a loose mat or felt, introduced into a platen press, and subjected to a pressure of about 1300 psi that decreases to about 200 psi during the pressing step and a temperature of about 240° F. for about eighty (80) seconds. The resulting doorskin, after cooling, exhibits a density of 1o0 g/cc.

EXAMPLE 4

The following ingredients are combined and blended until the ingredients are homogeneously admixed to provide a wood composite admixture.

| Ingredient | % (by weight) |
| --- | --- |
| Wood Fibers[4] | 97.5 |
| Diphenylmethane diisocyanate[2] | 1.5 |
| Wax[3] | 1 |

The wood composite admixture then is formed into a loose mat or felt, introduced into a platen press, and subjected to a pressure of about 900 psi that decreases to about 150 psi during the pressing step and a temperature of about 220° F. for about eighty (80) seconds. The resulting doorskin, after cooling, exhibited a density of 1.0 g/cc.

Surprisingly and unexpectedly, doorskins of the present invention, manufactured at a low pressing temperature, demonstrated an improved ability to be adhesively secured to a wood frame compared to a doorskin including a traditional phenol-formaldehyde binder and manufactured at a press temperature of about 400° F. As an added advantage, the inventive doorskin can be manufactured from a wood fiber including about 5% to about 15% moisture, at a low pressing temperature, in as short a time period as one minute, whereas a doorskin including a phenol-formaldehyde resin binder requires at least about five minutes pressing time. Accordingly, the isocyanate bonded wood composite and method of the present invention provide both economies of energy and time in comparison to conventional wood composites and their method of manufacture.

Obviously, many modifications and variations of the invention as hereinbefore set forth can be made without departing from the spirit and scope thereof and therefore only such limitations should be imposed as are indicated by the appended claims.

What is claimed is:

1. A wood composite consisting essentially of a mixture of:
   (a) about 95% to about 99% by weight of a wood fiber, wherein the wood fiber includes about 5% to about 15% by weight moisture;
   (b) about 1% to about 4% by weight of an organic isocyanate having at least two isocyanate moieties; and
   (c) 0% to about 2% by weight wax;
   wherein said wood composite has a density of about 0.9 g/cc to about 1.1 g/cc and is essentially free of an added compound having an active hydroxyl moiety which is reactive with said organic isocyanate.

2. The wood composite of claim 1 wherein the isocyanate is selected from the group consisting of toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4''-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2',5,5'-tetraisocyanate; 3,3'-dichlorophenyl-4,4'-diisocyanate; 2,2',5,5'-tetrachlorodiphenyl-4,4,'-diisocyanate; trimethylhexamethylene diisocyanate; m-xylene diisocyanate; polymethylene polyphenylisocyanates; and mixtures thereof.

3. A doorskin comprising a wood composite in the form of a doorskin, such wood composite consisting essentially of:
   (a) about 95% to about 99% by weight of a wood fiber, wherein the wood fiber includes about 5% to about 15% by weight moisture;
   (b) about 1% to about 4% by weight of an organic isocyanate having at least two isocyanate moieties; and
   (c) 0% to about 2% by weight wax;
   wherein said wood composite has a density of about 0.9 g/cc to about 1.1 g/cc and is essentially free of an added compound having an active hydroxyl moiety which is reactive with said organic isocyanate.

4. The doorskin of claim 3 wherein the organic isocyanate is selected from the group consisting of toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4''-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethyl-4,4'-biphenyl diisocyanate; 4,4'-dimethyldiphenylmethane-2,2',5,5'-tetraisocyanate;

3,3'-dichlorophenyl-4,4'-diisocyanate; 2,2',5,5'-tetrachlorodiphenyl-4,4'-diisocyanate; trimethylhexamethylene diisocyanate; m-xylene diisocyanate; polymethylene polyphenylisocyanates; and mixtures thereof.

5. The doorskin of claim 3 comprising:
   (a) about 95% to about 98% by weight of said wood fiber;
   (b) about 1.5% to about 3.5% by weight of said organic isocyanate; and
   (c) about 0.5% to about 1.5% by weight of said wax.

6. The doorskin of claim 3 wherein said wood fiber is selected from pine wood fiber and mixed Southern hardwood wood fiber, and wherein said organic diisocyanate is diphenylmethane diisocyanate.

7. A method of manufacturing a wood composite comprising the steps of:
   (a) forming a wood composite mixture consisting essentially of:
      (i) about 95% to about 99% by weight of a wood fiber, wherein the wood fiber includes about 5% to about 15% by weight moisture;
      (ii) about 1% to about 4% by weight of an organic isocyanate having at least two isocyanate moieties; and
      (iii) 0% to about 2% by weight wax, wherein said wood composite mixture is essentially free of an added compound having an active hydroxyl moiety which is reactive with said isocyanate, and
   (b) compressing the wood composite mixture at a temperature of about 200° F. to about 320° F. and at a sufficient pressure and for a sufficient time for the organic isocyanate to interact to provide the wood composite, said wood composite having a density of about 0.9 g/cc to about 1.1 g/cc.

8. The method of claim 7 wherein the isocyanate is selected from the group consisting of toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4''-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2',5,5'-tetraisocyanate; 3,3'-dichlorophenyl-4,4'-diisocyanate; 2,2',5,5'-tetrachlorodiphenyl-4,4'-diisocyanate; trimethylhexamethylene diisocyanate; m-xylene diisocyanate; polymethylene polyphenylisocyanates; and mixtures thereof.

9. The method of claim 7 wherein the wood composite is pressed at a pressure of about 100 to about 1500 pounds per square inch.

10. The method of claim 7 wherein the wood composite is pressed for a time period of about one to about ten minutes.

11. A method of manufacturing a doorskin product comprising the steps of:
   (a) forming a mixture consisting essentially of:
      (i) about 95% to about 99% by weight of a wood fiber, wherein the wood fiber includes about 5% to about 15% by weight moisture;
      (ii) about 1% to about 4% by weight of an organic isocyanate having at least two isocyanate moieties; and
      (iii) 0% to about 2% by weight wax, wherein said mixture is essentially free of an added compound having an active hydroxyl moiety which is reactive with said organic isocyanate, and
   (b) compressing the mixture at a temperature of about 200° F. to about 320° F. and at a sufficient pressure and for a sufficient time for the organic isocyanate to interact to form the doorskin, said doorskin having a density of about 0.9 g/cc to about 1.1 g/cc.

12. The method of claim 11 wherein the isocyanate is selected from the group consisting of toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4''-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2',5,5'-tetraisocyanate; 3,3'-dichlorophenyl-4,4'-diisocyanate; 2,2',5,5'-tetrachlorodiphenyl-4,4'-diisocyanate; trimethylhexamethylene diisocyanate; m-xylene diisocyanate; polymethylene polyphenylisocyanates; and mixtures thereof.

13. The method of claim 11 wherein the mixture comprises:
   (a) about 95% to about 98% by weight of the wood fiber;
   (b) about 1.5% to about 3.5% by weight of the organic isocyanate; and
   (c) about 0.5% to about 1.5% by weight of the wax.

14. The method of claim 13 wherein said wood fiber is selected from pine wood fiber and mixed Southern hardwood wood fiber, and wherein said organic diisocyanate is diphenylmethane diisocyanate.

15. A wood composite consisting essentially of a mixture of:
   (a) about 95% to about 99% by weight of a wood fiber, wherein the wood fiber includes about 5% to about 15% by weight moisture;
   (b) about 1% to about 4% by weight of an organic isocyanate having at least two isocyanate moieties; and
   (c) about 0.5% to about 2% by weight wax;
wherein said wood composite has a density of about 0.9 g/cc to about 1.1 g/cc and is essentially free of an added compound having an active hydroxyl moiety which is reactive with said organic isocyanate.

* * * * *